United States Patent [19]
Vali et al.

[11] Patent Number: 5,345,522
[45] Date of Patent: Sep. 6, 1994

[54] REDUCED NOISE FIBER OPTIC TOWED ARRAY AND METHOD OF USING SAME

[75] Inventors: Victor Vali, Laguna Hills; David B. Chang, Tustin; I-Fu Shih, Los Alamitos, all of Calif.

[73] Assignee: Hughes Aircraft Company, Los Angeles, Calif.

[21] Appl. No.: 939,237

[22] Filed: Sep. 2, 1992

[51] Int. Cl.$^5$ .......... G02B 6/28; G01B 9/02; H01J 5/16; G01V 1/38

[52] U.S. Cl. .......... 385/24; 385/12; 356/345; 250/227.11; 250/227.19; 367/16; 367/19; 367/20

[58] Field of Search ......... 385/7, 12, 13, 14, 24, 385/27, 28, 30, 31, 39, 42, 88, 89; 356/345; 250/227.11, 227.19; 367/16, 19, 20

[56] References Cited

U.S. PATENT DOCUMENTS

| | | | |
|---|---|---|---|
| 4,314,363 | 2/1982 | Thigpen et al. | 367/16 |
| 4,743,113 | 5/1988 | Jubinski | 356/345 |
| 4,752,132 | 6/1988 | Pavlath | 356/345 |
| 4,775,216 | 10/1988 | Layton | 385/12 X |
| 4,889,986 | 12/1989 | Kersey et al. | 356/345 X |
| 5,011,262 | 4/1991 | Layton | 385/12 X |
| 5,140,154 | 8/1992 | Yurek et al. | 356/345 X |
| 5,140,559 | 8/1992 | Fisher | 356/345 X |
| 5,155,548 | 10/1992 | Danver | 356/345 |
| 5,173,743 | 12/1992 | Kim | 356/345 |
| 5,206,924 | 4/1993 | Kersey | 385/12 X |
| 5,218,418 | 6/1993 | Layton | 356/345 |
| 5,218,419 | 6/1993 | Lipson et al. | 356/345 |

OTHER PUBLICATIONS

"Characterization of an Eight-Element Time-Division Multiplexed Interferometric Fiber Sensor Array", A. D. Kersey et al., SPIE, vol. 985, Fiber Optic and Laser Sensors VI (1988) pp. 105–112.

"At-Sea Deployment of a Multiplexed Fiber Optic Hydrophone Array", M. L. Henning, C. Lamb, WDD5-1, OFS'88.

*Primary Examiner*—Brian Healy
*Attorney, Agent, or Firm*—Wanda K. Denson-Low

[57] ABSTRACT

A sensitive towed optical fiber sensor array 50, wherein the fiber sensors (60A–60N) are connected in parallel, and the optical fiber cable (34) is paid out from the towing ship at a velocity about equal to but opposite to the velocity of the towing ship. The fiber sensors (60A–60N) are immune to electromagnetic interference, and the output of the sensors can be isolated readily to the parallel hookup of the sensors. Turbulence and acceleration noise is greatly reduced due to the manner in which the fiber cable (34) is paid out, and crosstalk between sensors is eliminated.

8 Claims, 2 Drawing Sheets

REDUCED NOISE FIBER OPTIC TOWED ARRAY AND METHOD OF USING SAME

BACKGROUND OF THE INVENTION

The present invention relates to towed arrays used for underwater sound detection, and more particularly to an array which is characterized by reduced turbulence and acceleration noise.

The usefulness of towed arrays for underwater sound detection is limited by the noise in the system. The instrument noise background (which determines the ultimate sensitivity of the array) is caused to a large extent by 1) cross talk between individual hydrophones, 2) turbulence caused by the towing of the array cable through water, and 3) acceleration also caused by the towing.

Conventional towed arrays use piezoelectric sensors for detecting pressure variations due to acoustic waves. Such sensors are electrical and, therefore, sensitive to electromagnetic interference (EMI). It is also difficult to isolate the output of individual hydrophones; therefore, there is considerable cross talk between the sensors.

Fiber optic towed arrays are known, wherein a number of acoustic sensor elements such as fiber optic hydrophones are series connected as shown in FIG. 1. A laser 10 directs an input light pulse of length T into the optical fiber 12. The array hydrophones are Mach-Zehnder interferometric sensors formed by the sensing fiber optic coils $S_1, S_2 \ldots S_N$ and the reference coil 16, where $\tau$ is the delay time through each coil. The optical pulse train from the output fiber 14 carries pressure information sensed by the sensing coils. Such a system is described in further detail in "Characterization of an Eight-Element Fiber Sensor Array," A. D. Kersey et al., SPIE Vol. 985, Fiber Optic and Laser Sensors VI (1988). While such a system avoids the EMI problem, it is still difficult to isolate the output of different sensors, and the array still suffers from the background noise caused by towing turbulence and acceleration. Moreover, such a system is subject to intrinsic optical crosstalk which arises due to multiple couplings of optical pulses between the serial sensor chain and the output collection bus fiber.

To detect weaker sound sources, the self noise of the array has to be reduced. The self noise is caused in conventional towed arrays primarily by the speed of the array through the water. The speed causes turbulence and acceleration which appear as sound in the hydrophones that constitute the array, i.e., the apparent high background noise that has nothing to do with the target's sound present in the water (sea).

It is therefore an object of the present invention to provide a fiber optic towed array having high sensitivity and characterized by substantial reduction in self noise and by elimination of crosstalk among the sensors.

A further object is to provide a method for paying out a towed array from the towing vessel or vehicle in a manner so as to minimize the turbulence caused by the array moving through the water.

SUMMARY OF THE INVENTION

In accordance with one aspect of this invention, a method is provided for reducing turbulence and acceleration noise in a sensor cable array towed behind a towing vessel moving at a vessel velocity. The method comprising paying out the cable array from the vessel at a velocity about equal and opposite to the vessel velocity. As a result, the self noise of the array is virtually eliminated, and the sensitivity of the array is increased.

In accordance with another aspect of the invention, a fiber optic towed sensor array is disclosed. The array comprises a plurality of fiber optic sensor circuits arranged in parallel. Each sensor circuit includes a fiber sensor and a separate optical fiber for conducting light to and from the sensor. The array further includes laser means for generating light to be injected into the respective optical fibers. The contributions of particular sensors may be readily isolated and crosstalk between sensors is virtually eliminated through the use of the separate optical fibers for each sensor.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
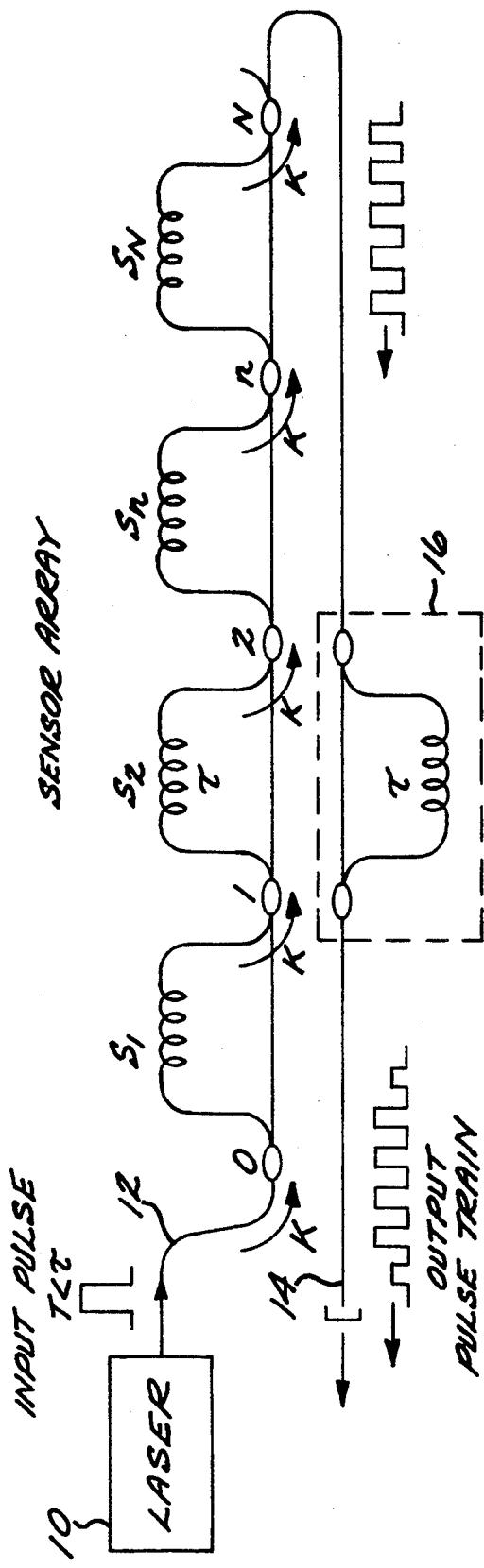
FIG. 1 illustrates a known fiber optic towed array of series-connected sensors.

The sensitivity of conventional towed arrays used for underwater sound detection is limited mainly by crosstalk between sensors and by the turbulence and acceleration noise generated by the array itself. These noises can be greatly diminished accordance with the present invention, thus making the array capable of detecting much lower sound intensities. The diminution is accomplished in this invention by (1) paying out the fiber cable at a velocity almost equal and opposite to the vehicle velocity, and (2) hooking up the fiber sensors in parallel rather than in the series form of conventional fiber optic towed arrays shown in FIG. 1.

With the parallel arrangement of sensors, the cross talk between individual fibers is practically zero. Since each hydrophone sensor circuit has its own single mode fiber to conduct light to the sensor, the effect of cross talk can be assumed to be zero.

Figure 2:
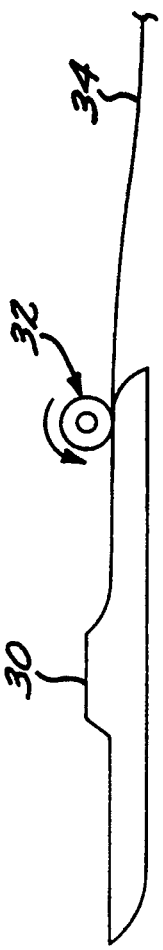
FIG. 2 illustrates the cable payout method in accordance with the present invention for compensating for the forward motion of the towing vehicle.

The effects of turbulence and acceleration are eliminated by making the array velocity through water very small. This can be done by paying out the array (or the cable to which it is attached) from the towing ship at a velocity equal, or almost equal, and opposite to the ship's velocity through the water. This is illustrated in FIG. 2 wherein a ship 30 is moving through the water at a given velocity. A drum 32 around which the fiber cable 34 is wound is mounted at the stern of the ship 30, and is arranged to rotate to pay out the cable 34 at a velocity about equal to but opposite to the velocity of the ship 30. Thus, if the ship velocity is v, $\Omega$ is the angular velocity of the drum, and r is the radius of the drum 32, then the velocity of the ship is related to the drum angular velocity and radius in accordance with the following relationship:

$$v = \Omega r$$

At present the light attenuation in the commercially available communication-type single mode fiber bundles is 0.13 db/km, making a 10-100 km long towed array (or array cable) feasible.

To eliminate turbulence, the maximum velocity of the array through water is given by the Reynolds number R $$R = (Vd/\gamma_r)$$

where V is the velocity of the array through water, d is the dimension (diameter) of the cable, and $\gamma_r$ is the kinetic viscosity of water ($\gamma_r = 0.01$ poise).

Solving for V, with the critical Reynolds' number for water of 1500-4000, and for an array cable diameter of 1 cm, $$V = (1500 \cdot 0.01/1) = 15 \text{ cm/sec.}$$

Figure 3:
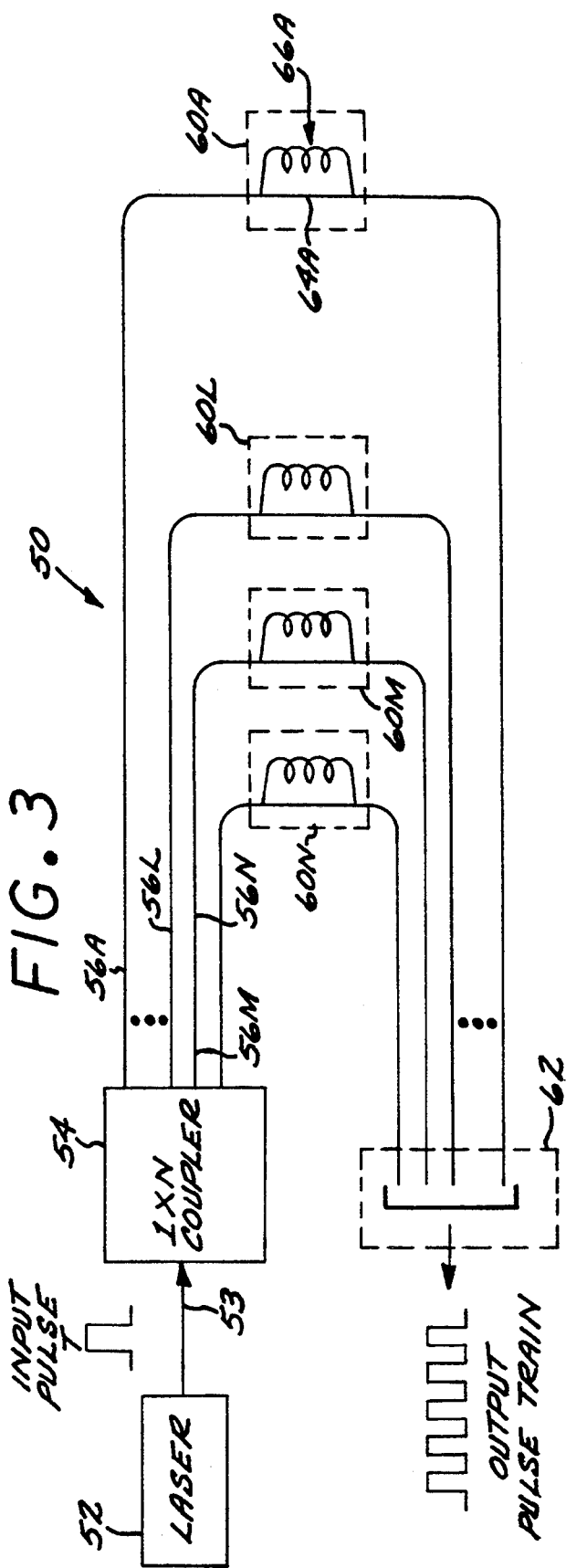
FIG. 3 illustrates a fiber optic towed array of parallel connected sensors in accordance with the present invention.

FIG. 3 illustrates a fiber optic towed array system 50 employing a parallel arrangement of sensors in accordance with the present invention. In this parallel arrangement, each sensor is connected in a separate fiber optic circuit. An input pulse of length T of light at visible or IR wavelengths from a laser 52 is injected into the input end of a fiber 53, which serves as the input of a 1×N optical coupler 54, which splits the light pulse into N different output optical output paths or fibers 56A-56N. The coupler 54 operates to divide the input pulse into N signal components. Each fiber 56A-N has associated therewith a corresponding hydrophone fiber sensor 60A-N. The sensors in this embodiment comprise a fiber Mach-Zehnder interferometer. Thus, sensor 60A comprises a reference arm 64A and a sensing arm 66A. Unlike the more complicated scheme of FIG. 1, a Mach-Zehnder interferometer can be formed by arms 64A and 66A by choosing a laser source with a sufficient coherent pulse length, which is longer than the optical path difference between the sensing and the reference arms.

Each fiber 56A-56L runs to a detector 62, which outputs a pulse train containing the pressure information sensed by the hydrophones. The output ends of all the fiber 56A-N are bound together, and the detector 62 in this embodiment is a photodetector large enough to detect light from all the fibers.

Figure 4:
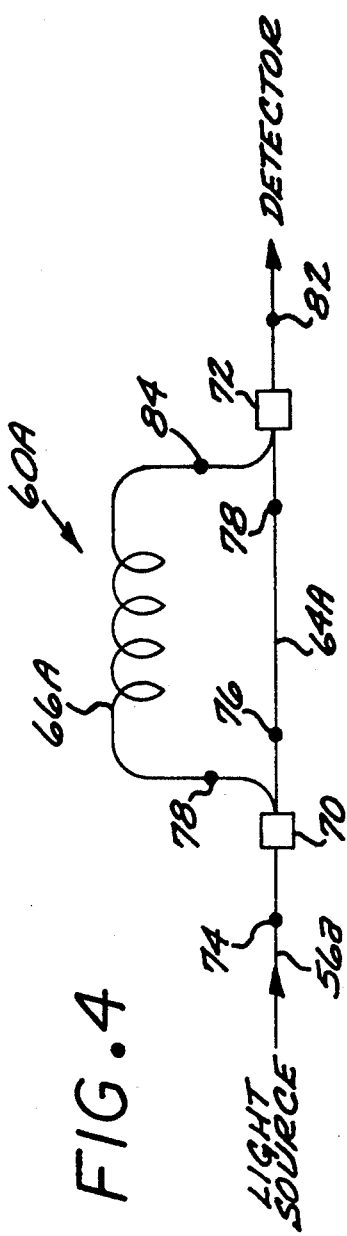
FIG. 4 shows one of the sensors of the towed array of FIG. 3 in further detail.

FIG. 4 illustrates an exemplary sensor 60A of the array 50 in further detail. The sensor 60A is spliced into the fiber 56A by couplers 74 and 82. A beamsplitter 70 divides the light from a light source between the sensor arm 66A and the reference arm 64A, via respective couplers 78 and 76. The light traversing these arms 66A and 64A is combined by a beam combiner 72 via respective couplers 84 and 78.

Thus, the input light pulse is divided into N pulses by the coupler 54, which are injected into all fibers simultaneously. However, because each hydrophone circuit has a different optical length, the output to the detector is a series of pulses. The signal-to-noise ratio can be improved by integrating over a number of consecutive input pulses within a period of time, e.g., 10 seconds. Each consecutive pulse should be separated by a length of time longer than the output pulse train.

Thus, the array 50 is made using many individual fiber hydrophones that are arranged in parallel and that are independent of each other. Fiber optic cables are readily available that contain up to 200 low attenuation (0.3 dB/Km) single mode fibers. The diameter of such a cable with steel reinforcing is only 1.5 cm. Commercially available communication-type optical couplers can be used for the fiber bundles. The maximum loss per coupler (for individual fibers in the bundle) is 0.4 dB. Each individual fiber hydrophone employs six couplers in this exemplary embodiment from the light source to the hydrophone to the detector. Thus, the total loss per hydrophone is (0.4×6) dB+3 dB (from the beamsplitter and beam combiner in the interferometer)+fiber attenuation losses. For a 5 km long array (light travels twice the array length), i.e., from the input end to the hydrophone 60A and then back to the output end at detector 62., the total light loss will be at most 8.5 dB. For a 50 km long array, it will be at most 35 dB, a tolerable loss for this type of system.

If there are a large number of individual hydrophone sensors, the information may have to be multiplexed. In this case the simplest way is to use a pulsed light source and arrange the array such that the optical distance difference between the individual hydrophones is of the order of 5 to 10 meters (the fiber length difference; the geometrical distance between hydrophones can be less). This requires the pulse length to be 25 to 50 nsec or less, and the output from each hydrophone is separated from the others.

In the sonic frequency range ($1-10^4$ Hz), the response of a fiber optic hydrophone is flat (independent of frequency). As an example, a 10 meter long fiber hydrophone (in the form of a short spiral less than 1 cm) can detect a less than 10 dB (relative to 1 $\mu$Pa) sound using a 10 $\mu$W light output (at the detector 62) and 10 second integration time.

Elimination of polarization fading of the fringe contrast to the Mach-Zehnder interferometer requires only that the interferometer and the associated couplers be made polarization maintaining. Polarization maintaining couplers will not alter the polarization states between the input laser light and the output laser light. Therefore, high fringe contrast can be obtained when two beams are brought together to interfere with each other.

The other source of signal fading (when the intensity of the sinusoidally varying fringe happens to be at the maximum or minimum points) is eliminated by varying the laser frequency by about $(\Delta f/f) \approx 10^{-7}$, such that the two consecutive fringe patters are shifted by 90°. In that case the sensitivity of the Mach-Zehnder interferometer hydrophone is maximized and is independent of the absolute value of the phase difference between the interferometer arms and is equal to:

$$\Delta I = 2I\phi$$

where $\Delta I$ is the measured intensity variation due to the phase shift $\Delta\phi$ (that depends on the source pressure variation) and I is the maximum light intensity at the detector. The variation of the laser frequency is described in further detail in co-pending application Ser. No. 07/939,250, entitled "Constantly High Sensitivity Fiber Optic Interferometer Sensor," by V. Vali, I-Fu Shih and D. B. Chang, filed Sep. 2, 1992, pending, and commonly assigned with the present application.

The present invention has applications in both geophysical prospecting (e.g., off-shore seismic oil prospecting) and military applications. Since the fiber optic towed array can be made less than 0.5 inches in diameter (versus 3 inches for other arrays) it can be used as a sensor on many warships. Typically, the cable will be a bundle of all the optical fibers required for each sensor circuit with a reinforcing cable to provide strength.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A fiber optic towed sensor array, comprising:
   a plurality of fiber optic sensor circuits arranged in parallel, each including a sensor and a separate optical fiber for conducting light to said sensor;
   laser means for generating light to be injected into said respective optical fibers; and
   processing means for processing outputs from the respective sensor circuits, wherein the contributions of particular sensors may be readily isolated by said processing means and crosstalk between sensors is virtually eliminated through the use of said separate optical fibers for each sensor;
   wherein said sensor circuits are arranged such that the optical distance between adjacent sensors is on the order of 5 to 10 meters, and said laser source comprises a pulsed laser having a pulsed length of less than 50 nanoseconds.

2. The sensor array of claim 1 wherein said sensor comprises a fiber Mach-Zehnder interferometer.

3. The sensor array of claim 1 wherein said plurality of sensor circuits comprises N circuits, and said laser means comprises a laser providing a laser output beam and a 1 by N optical coupler for splitting said laser output beam into N beams which are injected into said optical fibers for said sensor circuits.

4. The sensor array of claim 1 wherein said optical fibers are single mode fibers.

5. A method for reducing turbulence and acceleration noise in a towed sensor cable array towed behind a towing vessel moving at a vessel velocity, comprising paying out said cable array from said vessel at a velocity about equal and opposite to said vessel velocity;
   wherein said cable array has a nominal diameter of one centimeter, and the cable array is paid out from said vehicle at a rate so that the velocity of the cable array through water is no greater than 15 centimeters per second.

6. The method of claim 5 wherein said cable array is initially wound about a drum having a radius r mounted on said towing vehicle, and wherein said cable is paid out by rotating the drum at an angular velocity $\Omega$ about equal to $$\Omega = v/r$$

where v is the velocity of the towing vehicle.

7. The method of claim 5 wherein the cable array is paid out from said vehicle at a rate so that the velocity V of the cable array through water is no greater than $$V = R\gamma_r/d,$$

where d is the diameter of the cable array, R is the critical Reynolds number for water, and $\gamma_r$ is the kinetic viscosity of water.

8. The method of claim 5 wherein said sensor cable array comprises a fiber optic sensor array.

* * * * *